(No Model.)
J. H. BLOOD.
HOSE HOLDER.
No. 375,472.  Patented Dec. 27, 1887.
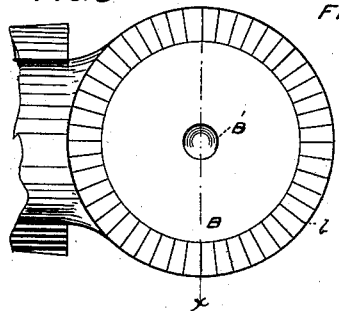
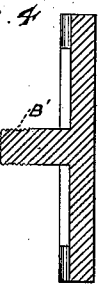
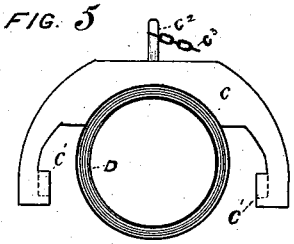
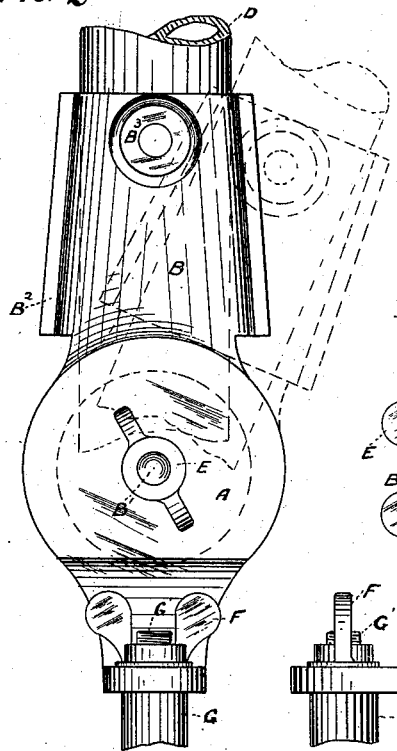
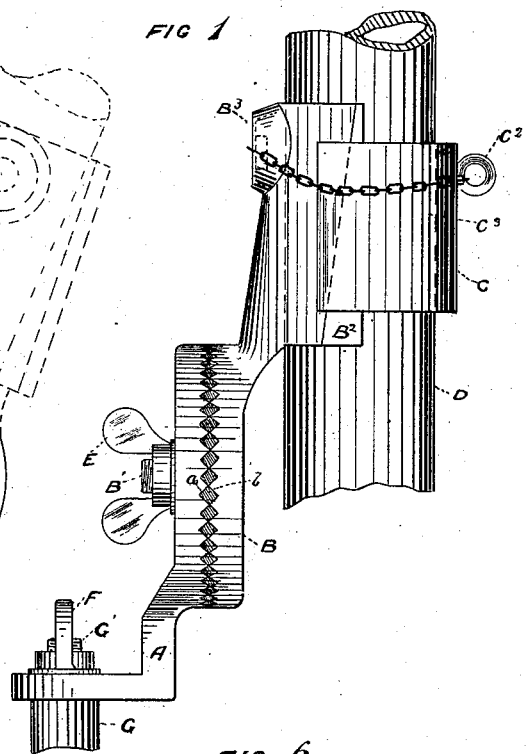
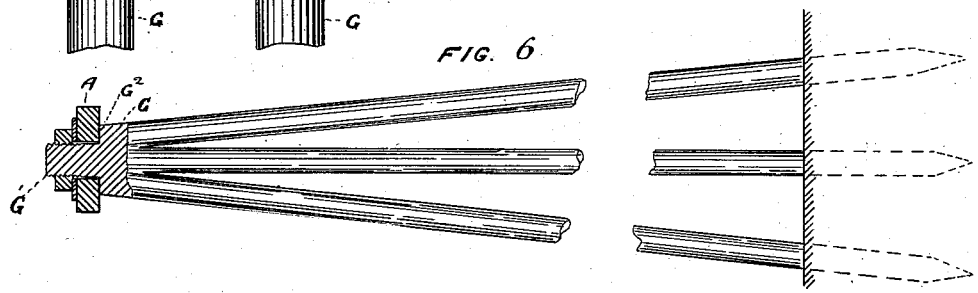
WITNESSES:
John J. Huddart.
M. A. McLaughlin
INVENTOR
John H. Blood
BY O'Brien & Co.
his ATTORNEYS

UNITED STATES PATENT OFFICE.

JOHN H. BLOOD, OF DENVER, COLORADO.

HOSE-HOLDER.

SPECIFICATION forming part of Letters Patent No. 375,472, dated December 27, 1887.

Application filed July 27, 1887. Serial No. 245,464. (No model.)

*To all whom it may concern:*

Be it known that I, JOHN H. BLOOD, a citizen of the United States, residing at Denver, in the county of Arapahoe and State of Colorado, have invented a new and useful Hose-Holder, of which the following is a specification, reference being had therein to the accompanying drawings, in which similar letters refer to corresponding parts.

My invention relates to hose-holders, and more particularly to hose-holders for gardens and lawns; and the object of my invention is to provide a hose-holder to which any size hose can be easily, quickly, and securely attached, and by means of which the hose is held firmly in any desired position, and at the same time may be easily and quickly adjusted, so as to throw the water in any desired direction.

In the drawings, Figure 1 is a side view of my device showing the hose attached and broken off, the device attached to a tripod, which is shown broken off. Fig. 2 is a front view of the same, showing by dotted lines one of the different positions to which the hose may be adjusted. Fig. 3 is a view of the upper ratchet-bracket, showing the circular ratchet on the same with a portion of the bracket broken off. Fig. 4 is a sectional view of the same taken on the line $x\ x$. Fig. 5 is an end view of the collar, also showing a transverse section of the hose. Fig. 6 is a view of the tripod, showing the top end in section and the manner of attaching my device.

My said device is composed of lower ratchet-bracket, A, upper ratchet-bracket, B, said bracket B being provided with threaded projecting portion B', outwardly-projecting wedge-shaped edges B², and projecting boss B³; also, of collar C, provided with inwardly-projecting wedge-shaped edges C' and eye C²; also, the chain C³ and thumb-nuts E and F. In the construction of my said device, bracket A is adjustably attached to tripod G, which is provided with threaded extension G' and shoulder G² by means of thumb-nut F. Bracket B is adjustably attached to bracket A by means of threaded projecting portion B' and thumb-nut E, and held stationary in whatever position desired by means of the ratchets $a$ and $b$. Chain C³ is attached to projecting boss B³ of bracket B by means of a button or flattened link, and to eye C² of collar C in any suitable manner for permanently attaching said collar C to bracket B when said device is not in use.

My said device may be made of iron, brass, or any other suitable material.

In the use of my said hose-holder, the same is securely placed in any desired part of the garden or lawn by means of tripod G and hose D, attached to bracket B by means of collar C. The hose D may then be held in or changed to any desired position by loosening thumb-nut E and adjusting bracket B upon bracket A, thus giving the hose any vertical position or any horizontal position desired, and by loosening thumb-nut F and adjusting bracket A upon tripod G giving the hose any lateral position desired.

I do not wish to confine myself exclusively to the use of the tripod in connection with my improved hose-holder, as it may be adjustably attached to any hose-reel or other suitable device for supporting the same.

Having thus described my improved device, what I claim, and desire to secure by Letters Patent of the United States, is—

1. In a hose-holder, ratchet-brackets A and B, adjustably attached together by means of threaded projecting portions B' of bracket B and the thumb-nut E, collar C, permanently attached to bracket B by means of chain C³, and adjustably attachable to bracket B by means of wedge-shaped edges B² of bracket B and C' of collar C, in combination with tripod G, to which is attached bracket A, by means of thumb-nut F and threaded extension G' of tripod G, substantially as set forth and described.

2. In a hose-holder, the combination of tripod G, provided with threaded extension G' and shoulder G², thumb-nut F, bracket A, provided with circular ratchet $a$, bracket B, provided with circular ratchet $b$, threaded projecting portion B', wedge-shaped edges B², and projecting boss B³, thumb-nut E, collar C, provided with wedge-shaped edges C', and eye C², and chain C³, as described, and for the purpose set forth.

JOHN H. BLOOD.

In presence of—
F. A. WILLIAMS,
JOHN S. GIBONS.